United States Patent
Ohnesorge

(10) Patent No.: US 6,994,241 B1
(45) Date of Patent: Feb. 7, 2006

(54) POWER SQUARE AND STATIONARY NAIL BRIDGE CONVEYOR SYSTEM FOR SHEATHING PRE-FRAMED EXTERIOR WALL PANELS

(75) Inventor: David Ohnesorge, Columbia, MO (US)

(73) Assignee: Mitek Holdings, Inc., Wilmington, DE (US)

( * ) Notice: Subject to any disclaimer, the term of this patent is extended or adjusted under 35 U.S.C. 154(b) by 41 days.

(21) Appl. No.: 10/331,300

(22) Filed: Dec. 30, 2002

(51) Int. Cl.
B27F 4/00 (2006.01)

(52) U.S. Cl. .............................. 227/100; 227/7; 227/30; 227/110

(58) Field of Classification Search .................... 227/7, 227/30, 44, 99, 100, 152, 90, 110; 29/430; 144/3.1, 253.5, 253
See application file for complete search history.

(56) References Cited

U.S. PATENT DOCUMENTS

| | | | |
|---|---|---|---|
| 2,111,081 A | 3/1938 | Taylor | |
| 2,456,221 A | 12/1948 | Stillwell et al. | |
| 3,090,961 A | 5/1963 | McRae et al. | |
| 3,121,876 A * | 2/1964 | Jensen | 227/7 |
| 3,539,087 A * | 11/1970 | Randolph | 227/3 |
| 3,552,624 A * | 1/1971 | Dykeman et al. | 227/3 |
| 3,557,439 A | 1/1971 | Dykeman | |
| 3,591,067 A * | 7/1971 | Vial | 227/84 |
| 3,628,714 A * | 12/1971 | Offenwanger | 227/7 |
| 3,743,160 A * | 7/1973 | Bowers, Jr. | 227/100 |
| 3,873,015 A * | 3/1975 | Whitaker | 227/7 |
| 3,968,560 A | 7/1976 | Vial | |
| 4,133,097 A | 1/1979 | Slade | |
| 4,867,819 A | 9/1989 | Richardelli | |
| 5,058,795 A | 10/1991 | Tonus | |
| 5,058,819 A | 10/1991 | Lacour | |
| 5,646,860 A | 7/1997 | Greiner et al. | |
| 5,727,301 A | 3/1998 | Kugo | |
| 6,089,434 A | 7/2000 | Gleason | |

\* cited by examiner

Primary Examiner—Louis K. Huynh
Assistant Examiner—Chukwurah Nathaniel
(74) Attorney, Agent, or Firm—Senniger Powers

(57) ABSTRACT

The invention discloses a method and apparatus for squaring wall panel assemblies prior to nailing sheathing material thereto. A preformed wall section having a frame and studs has a sheathing member placed thereover and fastened thereto whereby said components form a prefabricated wall section. To ensure that the assembled wall section is square the assembly line has squaring stops positioned on each side of the guide track. These stops are engineered to be in alignment with each other and causing the workpiece to form two right angles prior to release for nailing.

11 Claims, 4 Drawing Sheets

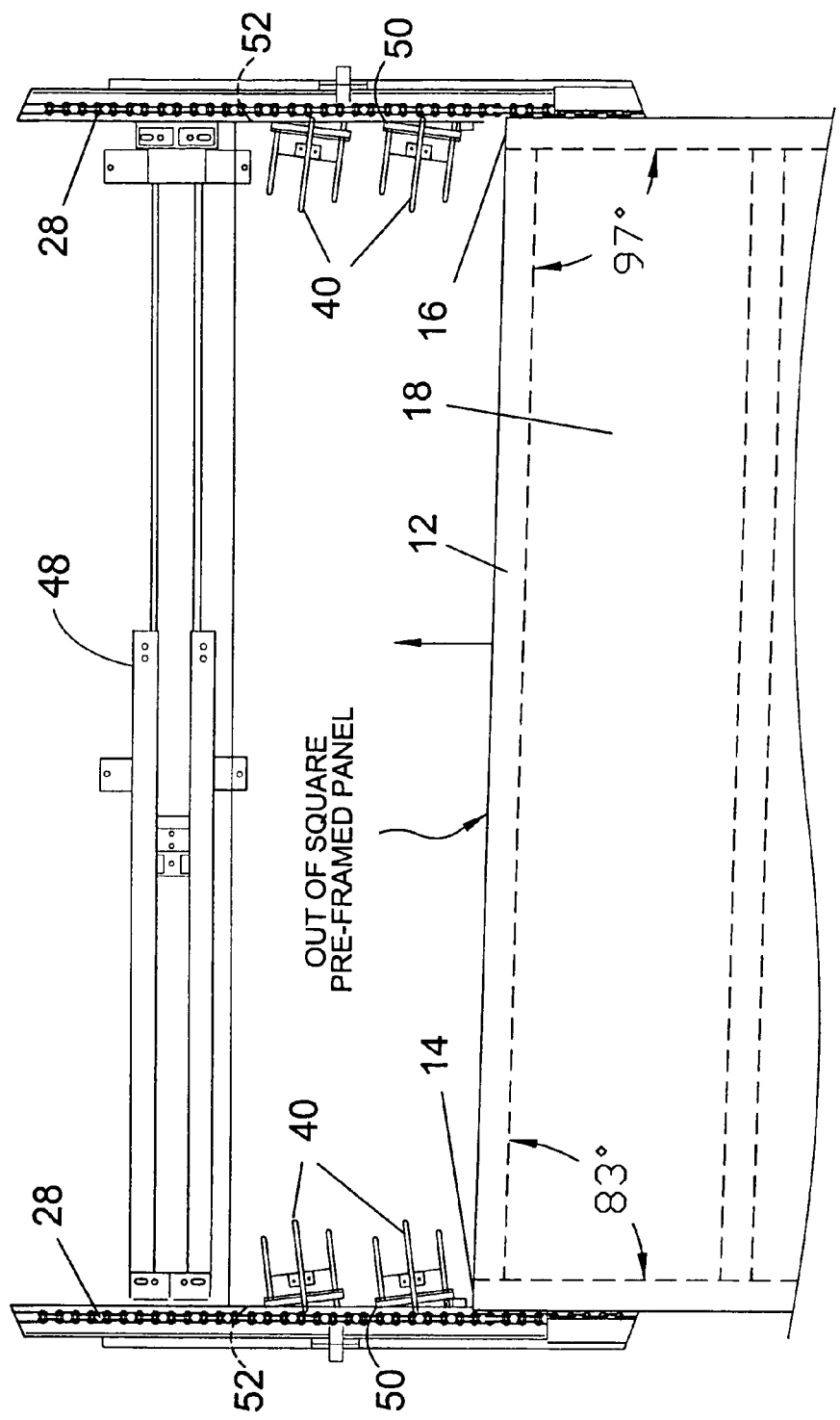

POWER SQUARE AND STATIONARY NAIL BRIDGE CONVEYOR SYSTEM FOR SHEATHING PRE-FRAMED EXTERIOR WALL PANELS

BACKGROUND OF THE INVENTION

1. Field of the Invention

The present invention relates generally to nailing machines and, more specifically, to a method and apparatus for squaring fabricated framing members prior to nailing facing material comprising components including sheathing thereto. A preformed wall section having a frame and studs has a sheathing member placed thereover and fastened thereto whereby said components form a prefabricated wall section. To ensure that the assembled wall section is square the assembly line has stops positioned on each side of the guide track. These stops are engineered to be in alignment with each other and causing the workpieces to form two right angles prior to release for nailing.

2. Description of the Prior Art

There are other panel assembly systems designed for fastening sub-components. Typical of these is U.S. Pat. No. 2,111,081 issued to R. G. Taylor, on Mar. 15, 1938.

Another patent was issued to G. E. Stilwell, on Dec. 14, 1948 as U.S. Pat. No. 12,456,221. Yet another U.S. Pat. No. 3,090,961 was issued to K. M. McRae, on May 28, 1963 and still yet another was issued on Jan. 5, 1971 to Edgar G. M. Dykeman & Kathaleen M. Dykeman, as U.S. Pat. No. 3,552,624.

Another patent was issued to Edgar G. M. Dykeman & Kathaleen M. Dykeman on Jan. 26, 1971 as U.S. Pat. No. 3,557,439. Yet another U.S. Pat. No. 3,968,560 was issued to Garye R. Vail on Jul. 13, 1976. Another was issued to Edgar O. Slade on Jul. 5, 1977 as U.S. Pat. No. 4,133,097 and still yet another was issued on Dec. 15, 1981 to Robert Schultz as U.S. Pat. No. 4,305,538.

Another patent was issued to Joseph Richardelli & Robert E. Thompson on Sep. 19, 1989 as U.S. Pat. No. 4,867,819. Yet another U.S. Pat. No. 5,058,819 was issued to Gilles Lacour on Oct. 22, 1991. Another was issued to Wally H. Greiner, Harold Ujc, and Frank Lacrosse on Jul. 8, 1997 as U.S. Pat. No. 5,646,860 and still yet another was issued on Mar. 17, 1998 to Daisaku Kugo as U.S. Pat. No. 5,727,301.

This invention relates to box nailing machines and particularly to one making crate heads for lettuce and other produce creates. The principal object of this invention is to provide an improved and simplified machine for arranging and feeding the various head parts in proper assembled order to the nailing machine, and for than actuating the latter, both to nail the slats on the frame and to simultaneously spike the rails and post together, all in automatic and timed relation.

This invention relates to box nailing machines and has particular utility in the manufacture of crate heads. The primary object of this invention is to provide a novel crate head maker which is relatively low in first cost and economical in operation. The objects of this invention also embrace the provision in a nailing machine of a novel shook magazine and feed mechanism; a novel work stacking mechanism, a novel nail chuck mechanism; a novel control mechanism for feeding the work intermediately from one position to another; a means for adjusting such a control mechanism for rendering the same flexible as to the feeding intervals which can be produced; and a means for manually setting or timing said feed control mechanism.

This invention relates, in general, to apparatus for fastening together structural members, and more particularly to an apparatus for conveying structural members beneath a fastening means for the application of fastening elements through the structural members. The principle object of this invention is to provide an apparatus which will fasten structural members together to allow for the prefabrication of structural panel sections.

This invention relates to a jig for assembling the stringers and deck boards of a pallet and carrying them beneath a nailing machine structure where they can be nailed together. The jig contains a pair of laterally adjustable, pivotally mounted support members for supporting the opposite longitudinal ends of the underlying stringers, the support members being arranged to be cammed outwardly when they have cleared the nailing machine structure to cause the partially constructed pallet to drop from the jig.

This invention relates to an assembly line for nailing wooden pallets which are formed by a plurality of deck boards placed crosswise to and on both sides of a plurality of spaced stringers. The assembly line includes a jig for positioning and holding the stringers and deck boards for on side of the pallet, a first automatic machine, a pallet turnover device, a second nailing machine for nailing the deck boards to the other side of the pallet, a pallet stacking device, and various transfer conveyers for automatically conducting the pallet to and from the mentioned components of the assembly line in the order named.

An automatic pallet assembling system which includes a pair of conventional nailing machines for separately nailing each side of a pallet and conveying means for carrying the half-finished pallet between the nailing machines. The stringers and deck boards are automatically fed to the first nailing machine in the proper sequence for nailing. After nailing, the half-finished pallet is automatically turned over and offset with respect to its direction of movement before being fed to the second nailing machine where the final set of deck boards are automatically fed into position for nailing. With five personnel (including two inspectors) operating the assembly system, a production rate of up to eight pallets per minute can be achieved.

An integrated system for fabricating the wall section for a building. The wall section includes a framework composed of plural studs disposed in a parallel array between an opposed pair of plates and has sheathing secured over the framework. The system comprises a first workstation including a frame for supporting the studs and a frame for supporting the plates in abutment with the ends of the studs. Automatic nailing means are supported on a carriage which is movable along the frame and is operative to nail the abutting stud and plate portions together. Portions of the frame means are retractable to enable a conveyor to move the framework, once assembled, to a second workstation. The first workstation also includes cutting means mounted on a carriage for cutting off excess end portions from the opposed plates extending beyond the most upstream stud of the wall section. The second workstation includes a conveyor for receipt of the assembled framework. Pneumatic stapling means are located at the second workstation and mounted on a carriage for movement therealong. The stapler means is operative to secure sheathing over the framework. The second workstation also includes a second carriage movable therealong and carrying a saw and a router for movement across the workstation. The saw and router are adapted for cutting away portions of the sheathing to form openings in the wall section for doors, windows, etc.

Portable apparatus for automatically constructing prefabricated stud walls or other frame structures from standard materials. Elongate studs are placed transversely at spaced intervals between a pair of elongate wall plate members by a reciprocatingly rotating stud-selecting mechanism and a linearly reciprocating spacer mechanism. As each stud is placed between the plate members, it is automatically nailed thereto, forming a portion of the wall frame, after which the completed portion of the frame is advanced an incremental distance along an assembly structure by the spacer mechanism, which pushes on the newly nailed stud to advance the frame to a position for nailing the next succeeding stud, and so forth in automatic cyclic fashion. A semi-automatic sheathing fastener mechanism includes a plurality of fastener guns and an automatically controlled actuation mechanism for placing fasteners at predetermined locations. Apparatus is provided for varying the spacing between wall plates and for reducing overall width of the apparatus for legal highway transport. The apparatus includes self-contained electrically-powered pneumatic and hydraulic systems, and fluid-operated control systems.

Laterally spaced apart longitudinal frame members are advanced to a frame assembly station by infeed drive units. Transverse frame members are advanced to the frame assembly table by laterally disposed sweep platforms and by diverter tables disposed above the frame assembly station. Automatic nailing assemblies on opposite lateral sides of the assembly table drive nails into the longitudinal frame members and transverse members disposed therebetween. Positioning of the transverse members is effected by computer controlled, reciprocative, joist-engaging stops downstream of the frame assembly table. Laterally spaced apart guide rails carry the frame workpiece to a glue-applying station equipped with a laterally movable nozzle and a pair of laterally spaced apart stationary nozzles. A frame indexer disposed below the glue-applying station advances and positions the workpiece under a sheet-placing station. The sheet placer positions the covering material so that abutting edges of adjacent sheets are disposed over the selected transverse frame members. An assembly indexer advances the frame and sheet material assembly to a sheet-fastening station and holds the transverse member bearing the abutting edge portions of the sheet material against reciprocative stops mounted in the base of the sheet nailing assembly. Vertically reciprocative nailing chucks are disposed above the workpiece in side-by-side pairs to position nails on the abutting edge portions of the sheet material. Associative reciprocative drive means force the nails into the sheet material and the selected transverse frame member disposed therebelow.

A paying out/winding in device eliminates torsion in a line in a rotary connection between a fixed member and a mobile member to which respective ends of the line are fixed. This device comprises a fixed spool carrying a relatively small number of turns and fastened to the fixed member. A mobile spool near and coaxial with the fixed spool carries a relatively small number of turns and is fastened to the mobile member. An arm rotatable about the axis of the fixed and mobile spools carries a satellite pulley at its free end. It is rotatable about an axis inclined at a relatively small angle to the axis of the fixed and mobile pulleys. When rotating more slowly than the mobile spool, it transfers line from the mobile spool to the fixed spool or vice-versa. The arm is rotated by a system which comprises at least one sliding coupling having a primary member, a secondary member fastened to the arm and a first freewheel mechanism coupling the primary member to the mobile spool. A second freewheel mechanism couples the secondary member to the fixed spool.

A table is provided to assist in the manufacture of building structures such as walls and the like, where the walls comprise a plurality of studs extending between top and bottom members. The table comprises a support surface for supporting the top and bottom members of the wall. The table includes grasping means to grasp the building structure and move it along the support surface. A computer-operated controller controls motors to locate the top and bottom framing members as desired along the table and to locate the top and bottom framing members at desired locations adjacent assembly stations. The assembly stations are used to attach a stud to each of the top and bottom members. The assembly stations are mounted on tracks and the location of the assembly stations along the track is controlled by a servo motor under control from the controller. The assembly stations may move transverse to the top and bottom framing members. The assembly stations are also movable in a vertical plane so as to be movable below the support plane of the table and to be movable to a plane to form connections. The assembly stations are also pivotable about a vertical axis.

An assembly system comprises a supply jig for holding and positioning a plurality of parts one by one, a supply center for inserting a plurality of parts into the supply jig, a plurality of assembly centers for taking out the parts from the supply jig and assembling the parts into products in parallel processing, carrier conveyor for carrying the supply jig from the supply center to the assy centers and return conveyor for returning the supply jig from the assembly centers to the supply center. The supply jig supplies the common parts which are required in all of the assembly centers, while each of the assembly centers comprises individual supply means for supplying a non-common part. Thus, this system can cope with assembling various types of products simultaneously, and can eliminate line stoppage upon occurrence of a trouble or for periodic inspection in any one of the centers, thereby production capability is improved.

While these assembly devices may be suitable for the purposes for which they were designed, they would not be as suitable for the purposes of the present invention, as hereinafter described.

It is thus desirable to provide a panel assembly system that allows for a process of moving the clamped wall panel assembly through the nail guns.

There are other panel building systems known in the art. While these panel building systems may be suitable for the purposes for which they were designed, they would not be as suitable for the purposes of the present invention, as hereinafter described. The present invention seeks to overcome the shortcomings of the prior art by introducing a conveyer assembly for moving pre-framed exterior wall panels that are clenched between drag chains that contact firmly against the top plate and the bottom plate of the panel to urge them along two parallel horizontal support beams where they are automatically squared to close, consistent tolerances and then sheathed.

Each wall section is placed upon the horizontal support beams which are selectively spaced apart by the operator to accommodate the wall panels being formed. A drag chain extends longitudinally along the top portion of each horizontal support beam and a pre-framed wall panel is placed therebetween to provide the impetus for the travel of the wall panel through the remainder of the assembly process.

One drag chain is rigidly mounted to its respective horizontal support beam and the other has a resilient cushioning material on the side opposite the panel so as to allow for the lateral movement thereof within a predetermined tolerance to compensate for variations in height along the length of the panel while maintaining an adequate amount of tension to effectively transport the panel along the conveyor assembly.

The panel advances into a pair of squaring stops, one on the inside of each horizontal support beam and substantially perpendicular thereto, that serve to prohibit the panel from traveling any further once first contact is made with a squaring stop triggering a sensor means. The squaring stops are fixed to allow for limited pivoting movement and are slightly inclined away from the approaching panels until such time that the opposing forward corner of the wall panel assembly contacts the opposing squaring stop triggering the opposing squaring stop sensor. Once the two opposing squaring stop sensors have been triggered indicating that the panel has been squared, pneumatic pistons are activated to retract the squaring stops so as to no longer inhibit the movement of the panel thereby enabling it to advance along the conveyor assembly.

An additional sensor is positioned within the guide track performing the function of repositioning the squaring stops into the path of the next wall panel assembly after the prior wall panel assembly has moved beyond the retracted squaring stops.

The clamping tension of the drag chains is preset to allow the chains to overcome the inertia of the panel and continue moving by slipping along the top plate or the bottom plate of the panel as long as it is butted up against its respective squaring stop. When the first plate contacts its squaring stop the corresponding drag chain slips until the second plate solidly contacts its respective squaring stop at which point the panel section is squared and the squaring stop members are pneumatically retracted to release the panel.

Sheathing is manually tacked into place once the panel is squared and the panel continues along the conveyor assembly and passes under a stationary nail bridge having a plurality of fastener guns. Once the panel is appropriately positioned the fastener guns are synchronously fired and the process continues at each stud as the panel passes therethrough. Furthermore, a stud-straightening element may also be employed to straighten each stud prior to nailing to insure that each nail is properly imbedded in the stud to yield a high quality finished panel.

SUMMARY OF THE PRESENT INVENTION

A primary object of the present invention is to provide a method and apparatus for squaring and sheathing exterior wall panels that transports pre-framed wall panels along a conveyor assembly that mechanically squares the panels prior to passing them through a stationary nail bridge where sheathing is secured to the panel via a plurality of fastener guns.

Another object of the present invention is to provide a method and apparatus for squaring and sheathing exterior wall panels that allows a plurality of panels to be manufactured simultaneously as they travel along an assembly line.

Yet another object of the present invention is to provide a method and apparatus for squaring and sheathing exterior wall panels that will reduce maintenance and repair requirements of the nail bridge due to the stationary properties thereof by greatly reducing the amount of moving components and the vibrations that are inevitable during mechanical movement that compromise the integrity of the wiring and components.

Still another object of the present invention is to provide a method and apparatus for squaring and sheathing exterior wall panels wherein the pre-framed panels rest on two elongate horizontal support beams that have moving drag chains on the top portion thereof to apply pressure medially to the top plate and the bottom plate in order to clench the panel to initiate travel therewith.

Another object of the present invention is to provide a method and apparatus for squaring and sheathing exterior wall panels wherein said drag chains are releasable and continue moving when movement of the panel is restricted by slipping over the wood until such time that the panel is squared thus activating the pneumatic pistons that retract the squaring stops allowing the drag chains to take hold and resume advancing the panel.

Another object of the present invention is to provide a method and apparatus for squaring and sheathing exterior wall panels that allows a plurality of panels to be manufactured simultaneously as they travel along an assembly line.

Yet another object of the present invention is to provide a method and apparatus for squaring and sheathing exterior wall panels that is inexpensive to manufacture and operate.

One more object of the present invention is to provide a method and apparatus for squaring and sheathing exterior wall panels that is simple and easy to use.

Additional objects of the present invention will appear as the description proceeds.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

LIST OF REFERENCE NUMERALS UTILIZED IN THE DRAWINGS 10 nailing apparatus
12 framed member
14 framed member first end
16 framed member second end
18 sheathing
20 conveyor assembly
22 guide tracks
24 fixed guide track
26 expanding guide track
28 chains
30 chain cushioning element
32 chain drive
34 nail bridge
36 nail guns
38 squaring mechanisms
40 squaring stops
42 pivot point
44 pneumatic piston
46 drive shaft
48 rail spacer
50 squaring stop sensor
52 guide path sensor

BRIEF DESCRIPTION OF THE DRAWING FIGURES

In order that the invention may be more fully understood, it will now be described, by way of example, with reference to the accompanying drawing in which:

FIG. 4 is a top partial view of the present invention in use.

DETAILED DESCRIPTION OF THE PREFERRED EMBODIMENTS

The following discussion describes in detail one embodiment of the invention and several variations of that embodiment. This discussion should not be construed, however, as limiting the invention to those particular embodiments. Practitioners skilled in the art will recognize numerous other embodiments as well. For a definition of the complete scope of the invention, the reader is directed to the appended claims.

Figure 1:
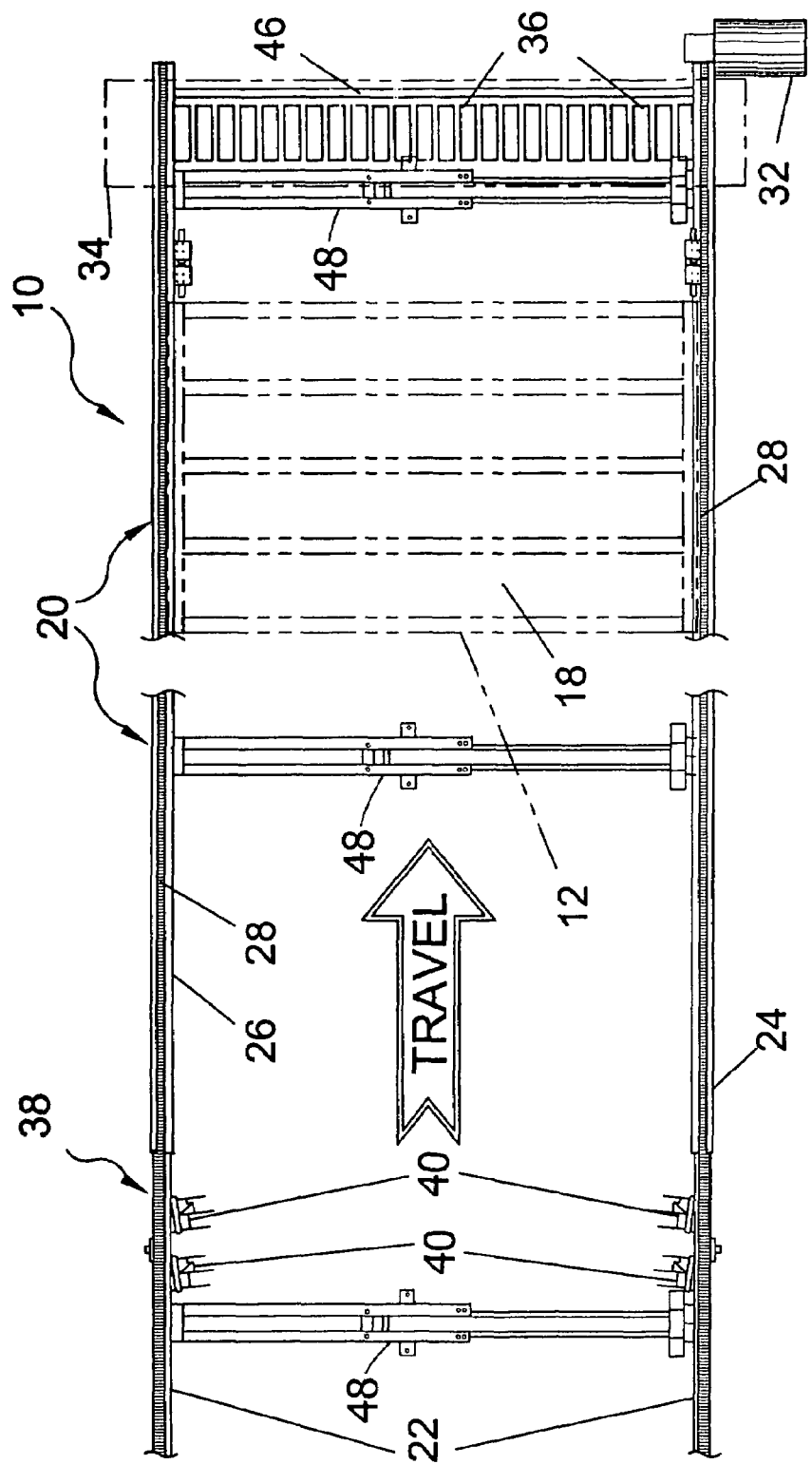
FIG. 1 is a top view of the present invention in use.

Referring to FIG. 1, the nailing apparatus 10 of the present invention comprises a conveyor assembly 20 and a nailing bridge 34 having a plurality of nail guns 36. The conveying assembly 20 is comprised of spaced apart guide tracks 22 having a fixed guide track 24 and a movable guide track 26 spaced apart by spacer elements 48. Each of the guide tracks has an associated drive chain 28 powered by drive motor 32. Also shown are the squaring mechanisms 38 comprised of squaring stops 40. The present invention is a method and apparatus for a conveyor assembly 20 that enables pre-formed exterior wall panels 12 (broadly, "workpieces", "assemblies" or "framed members") to be squared to close, consistent tolerances automatically while maintaining maximum material flow for consistent production throughput. A conveyor assembly 20 electro/mechanically squares the wall panels 12 which are then manually sheathed by workers who tack the sheathing 18 into place as the panels 12 travel at a pre-selected speed toward a stationary nail bridge 34. The nail bridge is programmed to use a linear plurality of nail guns 36 to effectively and rapidly secure the sheathing 18 thereto at each stud. When either set of squaring stops 40 is used the other set is retracted out of the way.

Figure 2:
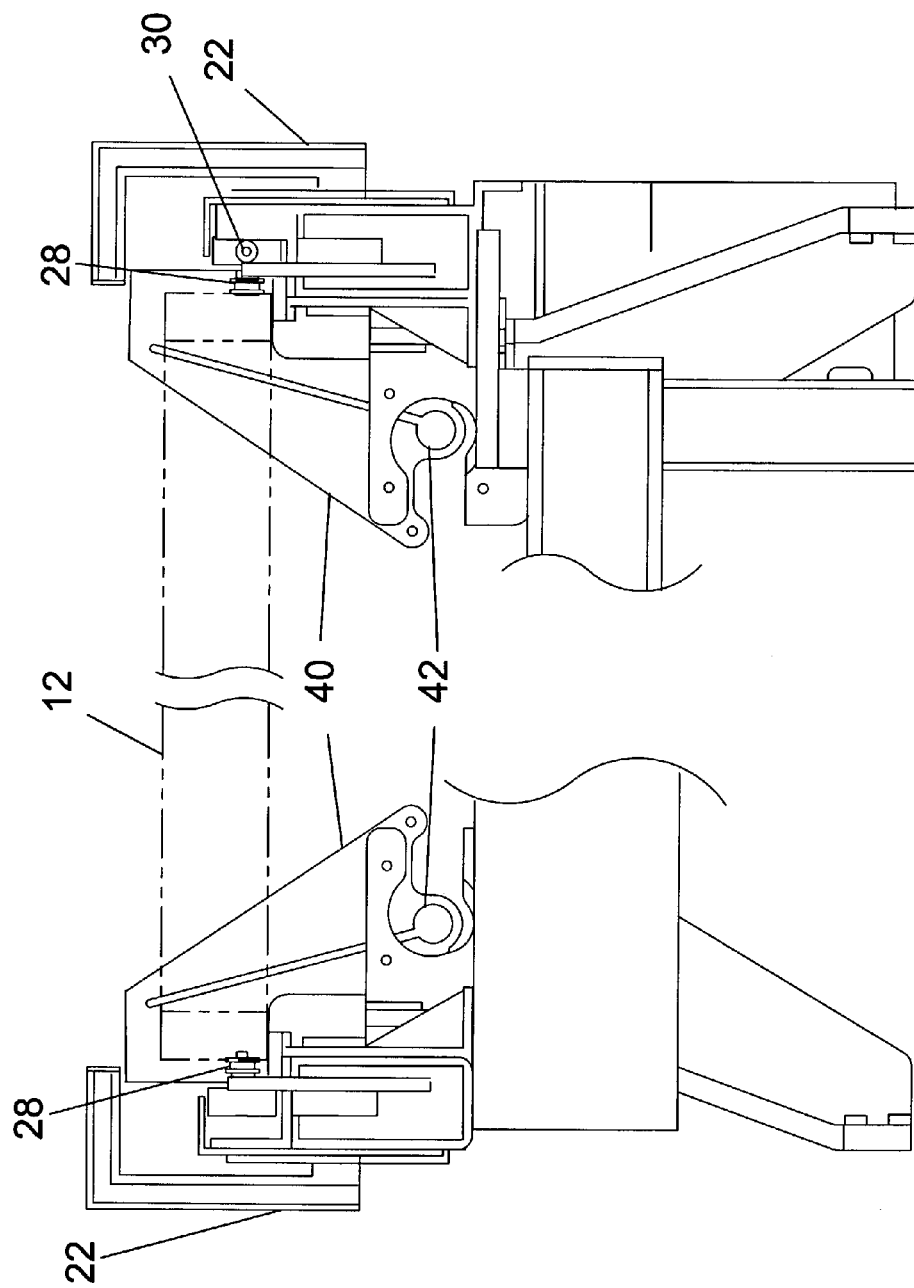
FIG. 2 is a side view of the squaring mechanism of the present invention.

Referring to FIG. 2, shown is the squaring mechanism 38 of the present invention with a pre-framed panel 12 (shown in phantom line) clenched between opposing drag chains 28 that transport the panel along the top of the horizontal support beams 22. Squaring stops 40 are situated along the pathway and prevent the edges of the pre-framed panel 12 from further movement once they contact their respective squaring stops 40 and continue to do so until both ends are firmly placed against their squaring stops 40. The squaring stops 40 are then retracted to allow the panel to resume travel. The drag chains 28 are designed to apply opposing tension to the panel to transport it through the squaring mechanism and the stationary nailing bridge.

Figure 3:
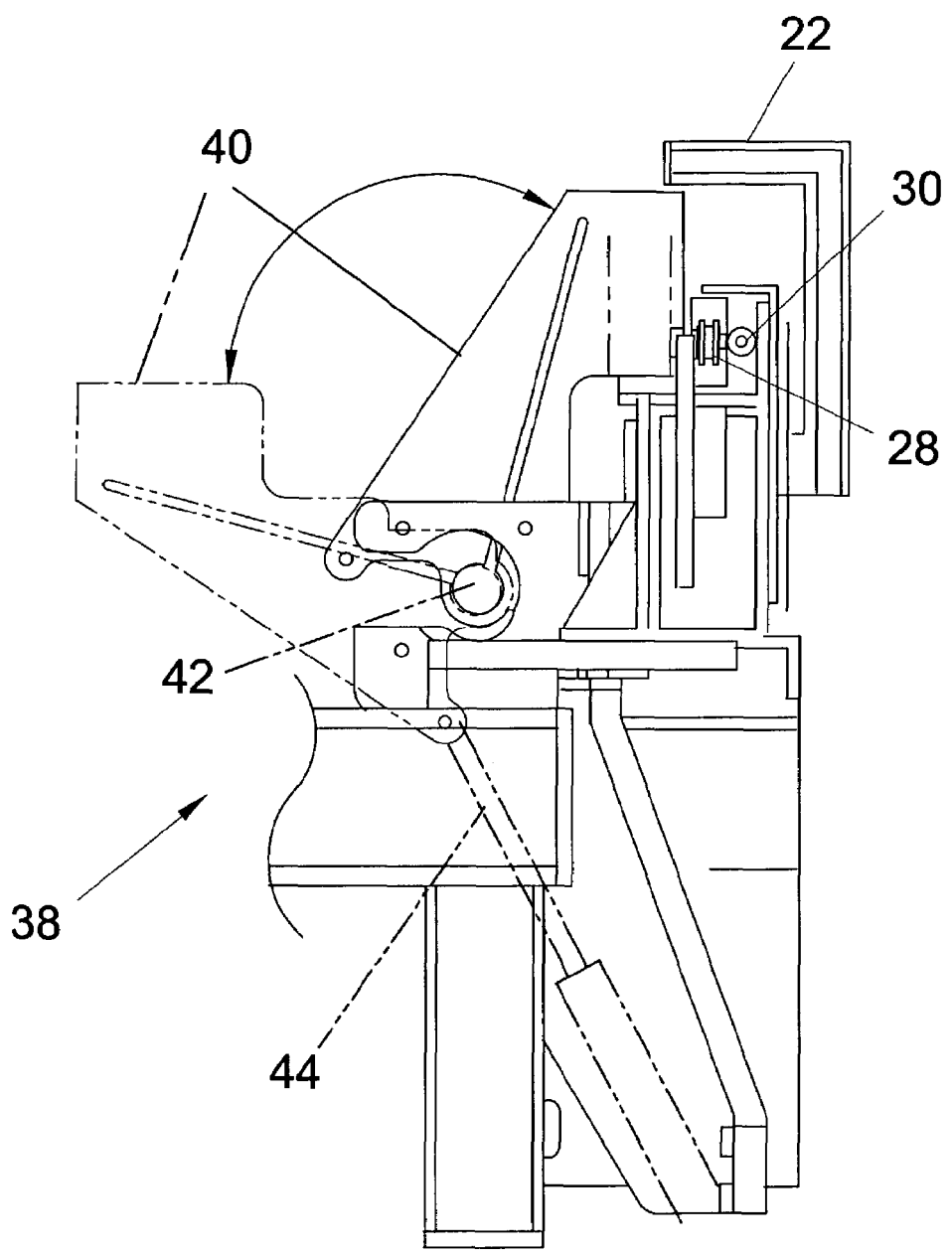
FIG. 3 is a side view of one squaring stop assembly.

FIG. 3 is a side view of one squaring stop assembly 38 demonstrating the retractable movement of the squaring stop 40 as shown in phantom line. Pneumatic pistons 44 are activated once the panel is square causing the squaring stops 40 to rotate on pivot points 42 to a panel disengaging position. The panel 12 resumes travel for sheathing and delivery through the stationary nail bridge 34.

Referring to FIG. 4, an out of square pre-framed panel 12 includes a framed panel first end 14 (an "end member") and a framed panel second end 16 (another "end member") and sheathing 18. The framed member first end 14 engages squaring stop 40 which causes chain 28 to slip until framed member second end 16 engages squaring stop 40 whereupon the opposing squaring stops 40 rotate from a panel engaging position to a panel disengaging position.

Each of the squaring stops 40 has a sensor 50 whereby when the first end 14 of the pre-framed panel 12 engages a squaring stop 40 a sensor 50 is triggered causing the drive chain 28 to slip while the opposite end 16 moves to an engaging position with the opposing squaring stop 40 which triggers the opposing sensor 50 engaging the squaring stop moving means 44 that disengages the squaring stop 40 from the panel 12. The drive chain 28 (broadly, "moving means") moves the panel 12 to the next function. A sensor means 52 positioned near the squaring stops 40 triggers the squaring stops movement means 44 to reposition the squaring stop 40 into the guide track (24, 26) for encountering the next workpiece 12.

What is claimed is new and desired to be protected by Letters Patent is set forth in the appended claims:

1. Apparatus for squaring a workpiece assembly including an end member connected to a cross member, the apparatus comprising:
    a conveyor for moving the workpiece assembly along a path;
    a pair of squaring stops, each squaring stop comprising a plate and a sensor disposed for engaging a portion of the workpiece assembly to block movement of the workpiece assembly portion along the path, said plate being pivotable between an extended position and a retracted position;
    the conveyor being disposed relative to the squaring stops for moving the workpiece assembly into engagement with the squaring stops to urge the cross member and end member into a squared configuration;
    wherein said sensor triggers the plate to pivot from said extended position to the retracted position to allow the work assembly to advance along the path.

2. Apparatus as set forth in claim 1 wherein the conveyor is adapted to move the workpiece assembly, while the workpiece assembly portion is blocked by one of the squaring stops, into engagement with another of the squaring stops.

3. Apparatus as set forth in claim 2 said conveyor comprising drive chains engageable with the workpiece assembly for moving the workpiece assembly along the path, the drive chains being capable of moving independently of each other for use in squaring the end member and cross member of the workpiece assembly.

4. Apparatus as set forth in claim 1 wherein in the extended position the squaring stops are disposed for engaging the workpiece assembly portion and in the retracted position the squaring stops are out of the path of the workpiece assembly portion to permit movement of the workpiece assembly past the squaring stops.

5. Apparatus as set forth in claim 4 wherein the squaring stops are each sized and shaped for blocking movement of both the end member and the cross member of the workpiece assembly in the extended position of each squaring stop plate.

6. Apparatus as set forth in claim 5 wherein each squaring stop plate is arranged generally perpendicular to the conveyor path in its extended position.

7. Apparatus as set forth in claim 6 wherein each squaring stop plate is mounted for pivoting between said extended and retracted positions.

8. Apparatus as set forth in claim 1 wherein the conveyor comprises spaced apart guide tracks for supporting the workpiece assembly, the guide tracks being mounted for adjustable movement in a direction transverse to the path for selecting the space between the guide tracks.

9. Apparatus as set forth in claim 1 further comprising a nailing gun disposed for driving nails into the workpiece assembly.

10. Apparatus as set forth in claim 9 wherein the nailing gun is arranged generally above the conveyor to drive nails downwardly into the workpiece assembly for use in connecting sheathing to the end member and cross member of the workpiece assembly.

11. Apparatus for squaring a workpiece assembly including an end member and a cross member, the apparatus comprising:

a conveyor for moving the workpiece along a path;

squaring stops, each squaring stop being adapted to be disposed for engaging a portion of the workpiece assembly to block movement of the workpiece assembly portion along the path;

the conveyor being disposed relative to the squaring stops for moving the workpiece assembly into engagement with the squaring stops, the conveyor being adapted to move the workpiece assembly, while the workpiece assembly portion is blocked by one of the squaring stops, into engagement with another of the squaring stops;

said conveyor comprising drive chains engageable with the workpiece assembly for moving the workpiece assembly along the path, the drive chains being capable of moving independently of each other for use in squaring the end member and cross member of the workpiece assembly.

* * * * *